United States Patent [19]
Piepers et al.

[11] 3,968,008
[45] July 6, 1976

[54] FISSILE ELEMENT AND A METHOD FOR CHARGING OR RECHARGING IT

[75] Inventors: Gijsbrecht Gerhardus Piepers, Heiloo; Christiaan Gustaaf Adolf Scholtus, Alkmaar; Leonard Hendrik Vons, Bergen, all of Netherlands

[73] Assignee: Reactor Centrum Nederland, The Hague, Netherlands

[22] Filed: Apr. 11, 1973

[21] Appl. No.: 349,940

[30] Foreign Application Priority Data
Apr. 20, 1972 Netherlands............... 7205288

[52] U.S. Cl. .................................................. 176/78
[51] Int. Cl.² ........................................... G21C 3/32
[58] Field of Search ............................... 176/76, 78

[56] References Cited
UNITED STATES PATENTS

| | | | |
|---|---|---|---|
| 3,338,791 | 8/1967 | Lass et al. | 176/78 |
| 3,607,639 | 9/1971 | Hokasen | 176/78 |
| 3,802,996 | 4/1974 | Jones | 176/76 |

FOREIGN PATENTS OR APPLICATIONS

| | | | |
|---|---|---|---|
| 1,036,852 | 7/1966 | United Kingdom | 176/78 |

*Primary Examiner*—Stephen C. Bentley
*Attorney, Agent, or Firm*—Cushman, Darby & Cushman

[57] ABSTRACT

Fissile element that can be easily assembled and also afterwards taken apart. This is facilitated by the use of tilting bolts and snap connections. The assembling may be done by freezing in of the bunch of fissile rods in demineralized water.

4 Claims, 16 Drawing Figures

FISSILE ELEMENT AND A METHOD FOR CHARGING OR RECHARGING IT

The invention relates to a fissile element intended for use in a nuclear reactor, which fissile element contains a plurality of oblong bodies containing fissile material, the said oblong bodies being preferably constructed in the form of fissile rods which extend between and are fixed in a base and a head of this fissile element, whilst they are surrounded by an approximately prismatic sleeve which fastens both around the base and around the head of the fissile element. Fissile elements of this kind are already known. They are used, inter alia, with boiling water reactors. In these known fissile elements the assembling of the components is brought about by joining the base and head of the element to a number of fissile rods by means of screwed connections. The remaining rods are merely held radially in the head and base. The prismatic sleeve, usually of zircalloy, is slid over the assembly comprising the head, the base and the bunch of fissile rods and is then fixed in position by being screwed to the head. This known embodiment of a fissile element shows, however, a number of drawbacks. This arises the fact that, since the fissile rods are used partly as a supporting construction, they are not all of the same shape. This gives rise to difficulties in manufacture; moreover, the deformation of the fissile rods in the fissile element as a result of irradiation may show differences. Because of all these factors it is only with great difficulty that the fissile rods can be detached for the purpose of replacing a burnt-up rod. This is in fact so troublesome that with rechargings of the fissile element it is generally only the sleeve that can be used afresh. A further difficulty is that individual inspection of the fissile rods is only possible for rods that are not used in a supporting element; besides, this procedure is rather complicated.

According to the invention these drawbacks are eliminated in that the said sleeve is rigidly fixed to the base. In this way it is rendered possible to use the sleeve as sole supporting component.

To permit of easy mounting and removal of the fissile rods, their ends are incorporated in the base by a snap connection. In a preferred embodiment this snap connection is made to consist of a pin and cylinder joint, at least one of which components, viz. the pin (also termed sub-plug) or cylinder as the case may be, is rendered resilient by means of a saw-cut in the longitudinal direction which penetrates some distance into the pin or cylinder, these latter components being furthermore provided respectively with a collar and with an internal groove. This gives the additional advantage that all the fissile rods are now constructed in a perfectly identical form.

An important feature in the present invention is that the head of the fissile element is fixed to the sleeve in such a manner that it can very easily be removed. The said fixing is effected by embodying in the head a number of tilting bolts which are connected with the sleeve. These tilting bolts are preferably so constructed that they have a clawlike bolt-head which, when in the screwed-up position, fixes itself into the sleeve wall.

Thanks to the measures described in the foregoing, both the head and base and the prismatic sleeve can be used several times.

According to a further variant of the invention the lattice, too, can be used several times, so that with recharging only the fissile rods need be changed. This is made possible in that the intermediate lattices are fixed by means of resilient retainers. This again is an important improvement as compared with the fissile elements or prior art, as with the latter the intermediate lattices are held in the axial direction by a fissile rod having special means of equipment, the so-called spacing rod. This spacing rod is no longer required either. Preference is given to a resilient retainer constructed as a sideway extension of the outer jacket of an intermediate lattice, in the form of a plate spring, which plate spring has near its free end and a peg that fits lockingly into an aperture of the sleeve wall.

The procedure for mounting a bunch of fissile rods in a fissile element according to the invention, consists in assembling the bunch of fissile rods upside down in the intermediate lattices, the whole being placed in a casting mould opening by hinges, this mould having approximately the same internal dimensions as the aforementioned prismatic sleeve, after which the mould is filled with demineralized water to such an extent that on the upper side of the mould the ends of the rod project above water. After this the demi-water is caused to freeze, a lifting eye being frozen in with it to provide a holding point during transport. As the resilient lips are frozen to the lattices when in the pressed-in position, a prismatic column of ice is formed which can easily be slid into the prismatic zircalloy sleeve.

The prismatically shaped block of ice not only contains the fissile rods but also the intermediate lattices. After the block of ice has been introduced into the sleeve the column is pressed down, so that the underside of the bunch that has remained icefree is placed in the resilient elements of the base. The penultimate operation consists in mounting the head on the element and thawing the demi-water. After being released by thawing the lifting eye can be removed. The fissile element is now ready for use. It can at once be mounted in the reactor, as the demi-water that is still in the fissile element is of the same quality as the water that will subsequently take part in the circulation process. Tests with the method outlined above showed that no permanent deformations of intermediate lattices and fissile rods occurred, whilst the available time up to the moment when the thawing process impeded this mounting operation was amply sufficient. In cases where the dimensions might be such that the wall of ice around the resilient lips is not thick enough to offer resistance to the forces of the plate spring, the ends of the plate spring on the inner side of the sleeve may be so constructed that they are connected by a dowel-like pin which fastens as an anchoring device into the ice mass.

According to an alternative method the tensioned plate springs are held in the opened-out condition by means of anchoring devices consisting of hooks or cramps made of demineralized ice. Towards the inner side of the sleeve these cramps are fitted to a fixed member in this sleeve or to another plate spring which is situated on the other side of the sleeve, approximately diametrically opposite the first plate spring.

A number of different embodiments of the invention are elucidated by way of example in the undermentioned figures, which give views as follows.

Figure 1:
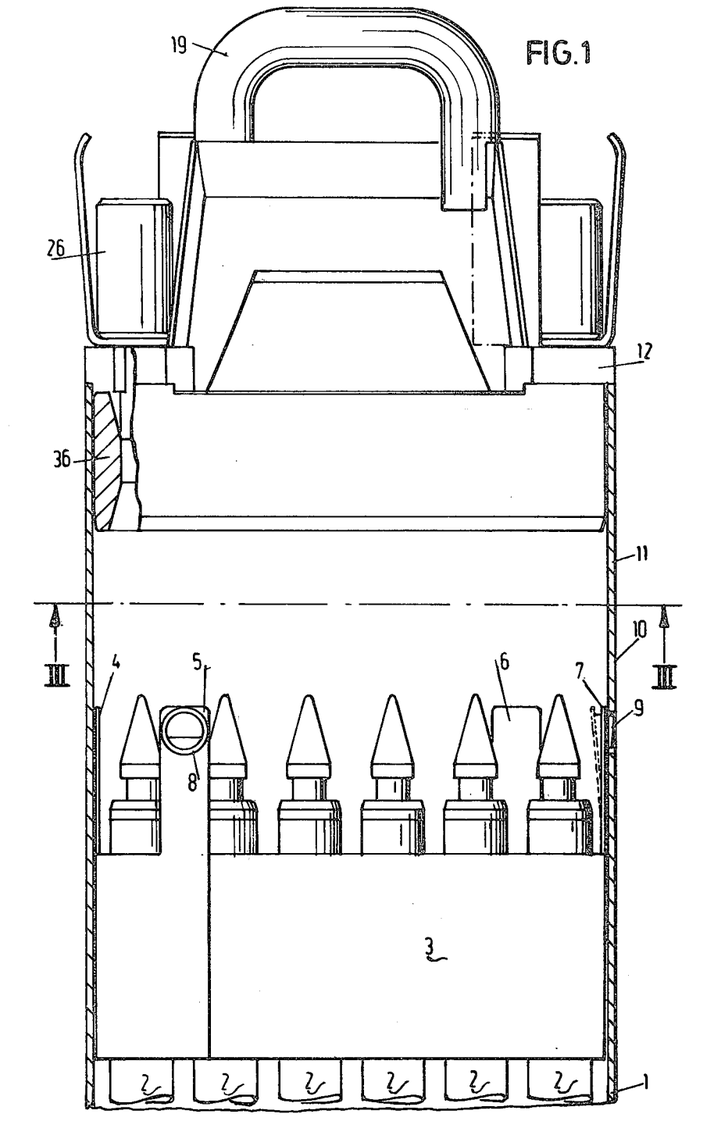
FIG. 1: a partly vertical cross-section of the upper side of a fissile element, including the head of the latter.

In FIG. 1, in which the top end of a fissile element 1 is represented, the fissile rods are denoted by 2. These fissile rods are supported at various distances in intermediate lattices, the topmost of which is denoted by 3. Projecting upwards from the intermediate lattices 3 are plate springs 4, 5, 6 and 7. Fastened to the ends of these plate springs are pegs 8 and 9 respectively. At peg 9 it can be seen that this peg locks into an aperture in wall 10 of the prismatic sleeve 11. The head 12 is joined on its upper side to the top end of sleeve 11. The manner in which the joint is effected is elucidated later on by reference to FIGS. 4, 5 and 6.

Figure 2:
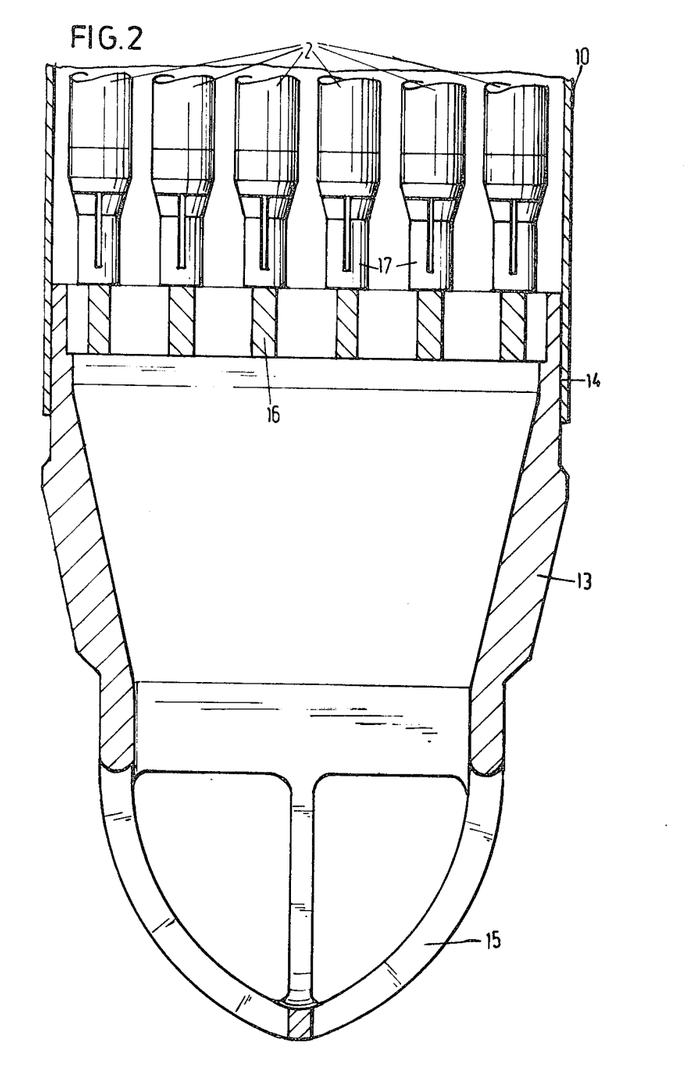
FIG. 2: a vertical cross-section of the base of a fissile element.

FIG. 2 shows a vertical cross-section of the base of the fissile element. This base consists of a tapering portion 13 provided with inlet apertures 15 at its lowermost end. The tapering portion 13 is rigidly connected at 14 with the underside of the prismatic sleeve 10. The upper side of the base is fitted with a bottom plate 16. In this bottom plate there are numerous apertures through which the cooling medium can flow upwards, whilst furthermore a number of cylinders are mounted upon them which serve to receive the bottom ends of the fissile rods. These cylinders, denoted by 17 in FIG. 2, are shown in greater detail in FIG. 7 which will follow later.

Figure 3:
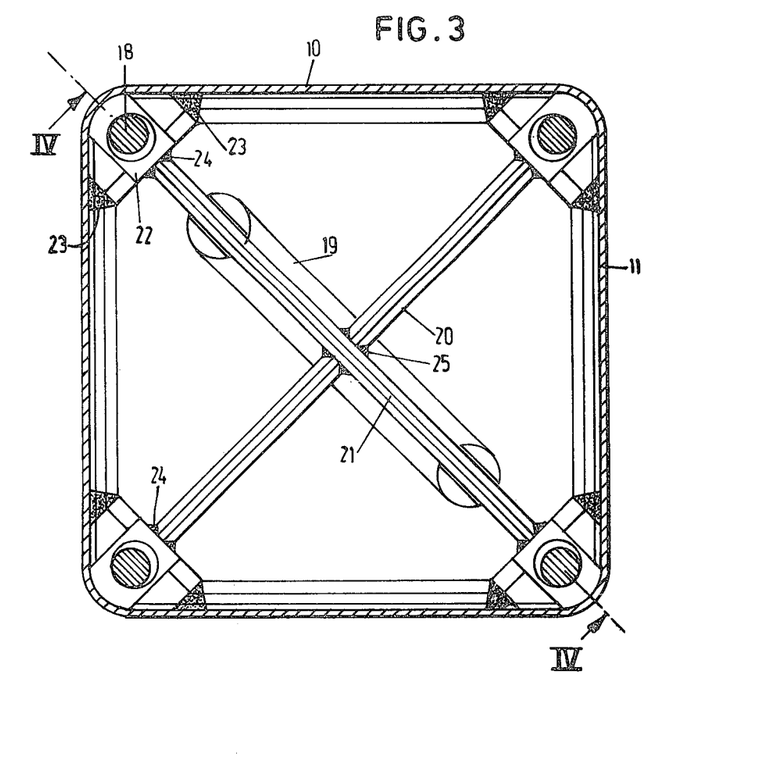
FIG. 3: a horizontal cross-section of the fissile element according to III — III in FIG. 1.

In FIG. 3 an upward-facing cross-section has been taken across the top end of a fissile element in FIG. 1. In this cross-section a transverse reinforcement 20, 21 can be seen, as well as a lifting eye 19 that is fitted to 21. Passage members 22 are fixed in the four corners, e.g. by means of welds 23. Cross-reinforcement 21, 22 also is reinforced by means of welds 24, 25. The passage members 22 afford passage to the tilting bolt 36. The shafts of these tilting bolts are denoted by 18.

Figures 4, 5:
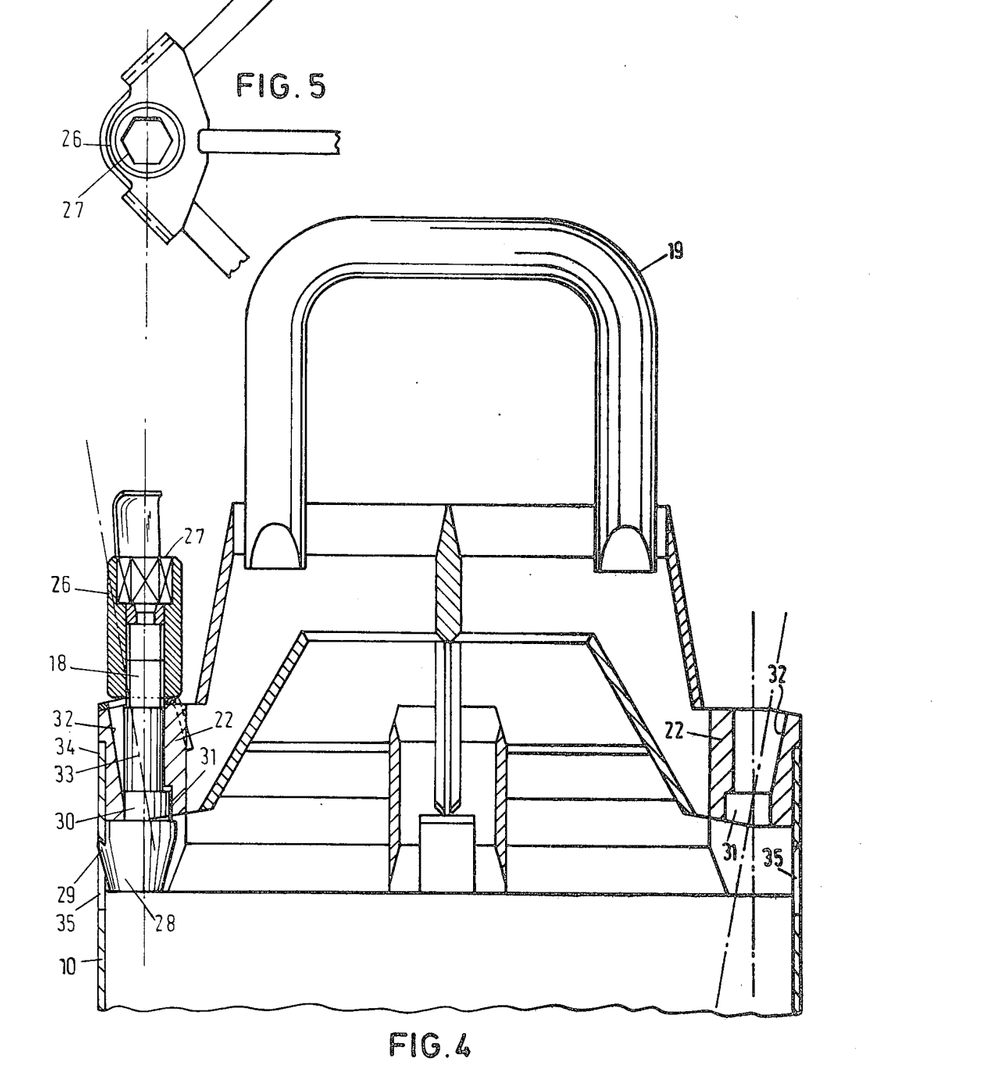
FIG. 4: a diagonal vertical cross-section of the upper side of the fissile element of FIG. 1 according to IV—IV in FIG. 3.
FIG. 5: a top plan view of one of the tilting bolts.

The manner in which these tilting bolts are fixed is further detailed in FIG. 4. On shank 18 of these bolts there is a nut 26 which is provided internally with a hexagonal head 27 for screwing up and unscrewing. Each tilting bolt has on its underside a head 28 whose side portion, at 29, is of clawlike construction. Over the head there is a partial collar 30. This collar fits into a cavity 31 of component 22. Part 33 is a thickened portion of the shaft of the bolt. At this portion the passage aperture in component 22 has an oblique cylindrical finish according to 32.

Figure 6:
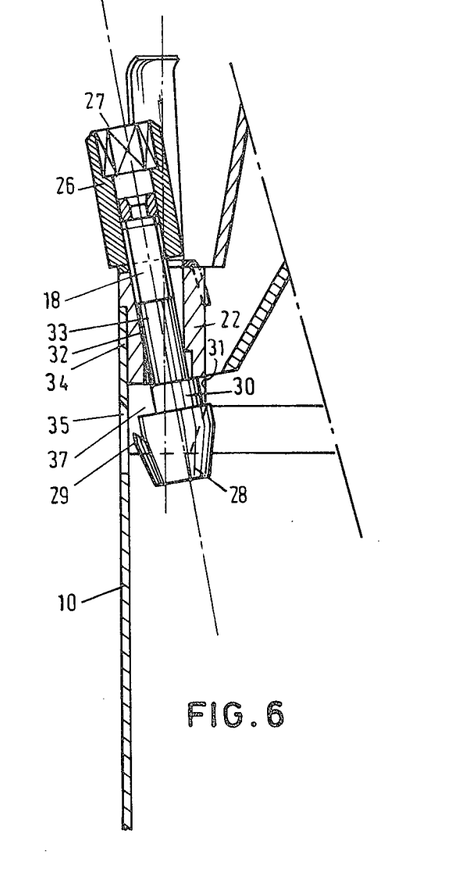
FIG. 6: a tilting bolt in the outwardly tilted position.

Unscrewing of the tilting bolts is effected as follows: Nut 26 has to be unscrewed. As a result of doing so, the tilting bolt 36 can be moved downwards so that the collar 30 no longer fits into the cavity 31. The tilting bolt 36 can now be tilted into the position 37 which is illustrated in FIG. 6. Now the head 28 no longer engages by claw 29 into aperture 35 of tube wall 10. Head 12 can now be removed from the fissile element, as there is only a sliding fit at 34.

Figure 7:
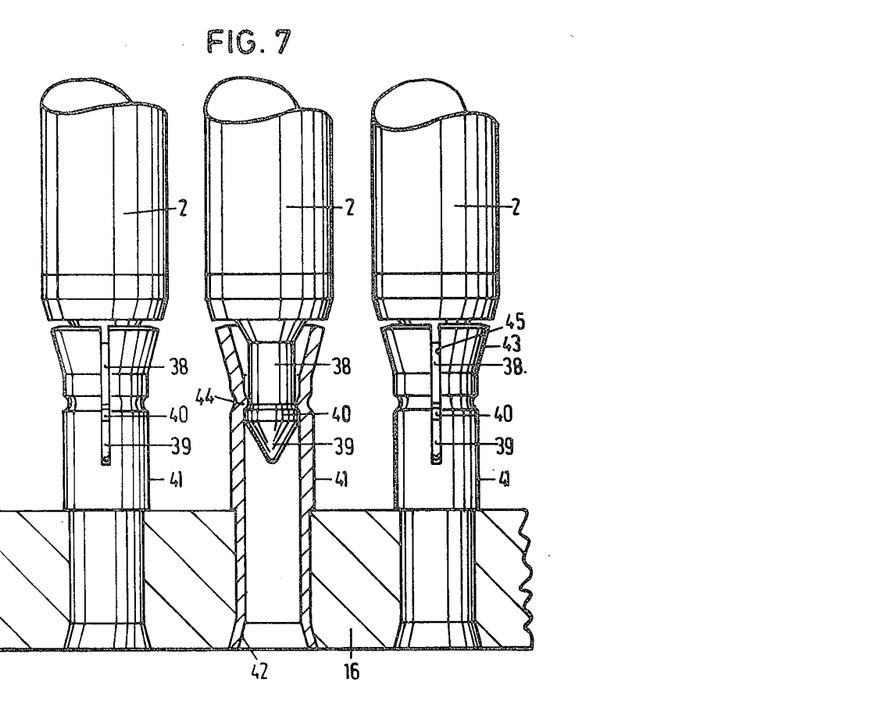
FIG. 7: a pin and cylinder joint on the underside of the fissile rods.

FIG. 7 shows that the underside of fissile rods 2 have a cylindrical portion 38 fitted to them. This cylindrical portion continues downwards into a conical portion 39 by the incorporation of a collar 40 between 38 and 39. A number of cylinders 41 are securely fixed in plate 16 of the base by being expanded at 42. The upper part of cylinder 41 has been given a trumpet-like widening at 43. Between 41 and 43 there is a groove 44. In addition, a saw-tooth 45 is provided which enables the two halves of portion 43 to move outwards to some extent. Thanks to this provision, it is at once possible to press the lower portion of fissile rod 2 into cylinder 41 in such a manner that the collar 20 passes the groove 44. Owing to the clamping action of component 43, cone 39 with its collar 40 is held by groove 44. As shown by the left-hand drawing in FIG. 8, the end 7 of the plate spring opposite FIG. 9 may be fitted with a dowel-type pin 46.

Figure 8:
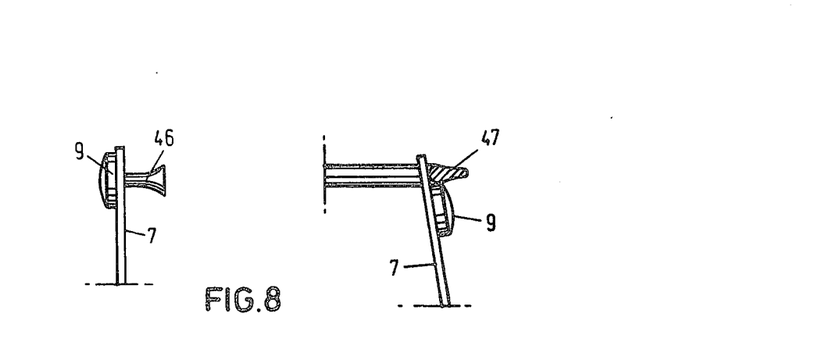
FIG. 8: two embodiments of ends of the plate spring.

The right-hand drawing of FIG. 8 shows how the plate spring 7, when tensioned, can be held by a hook or eye 47 made of demineralized ice.

Figure 9:
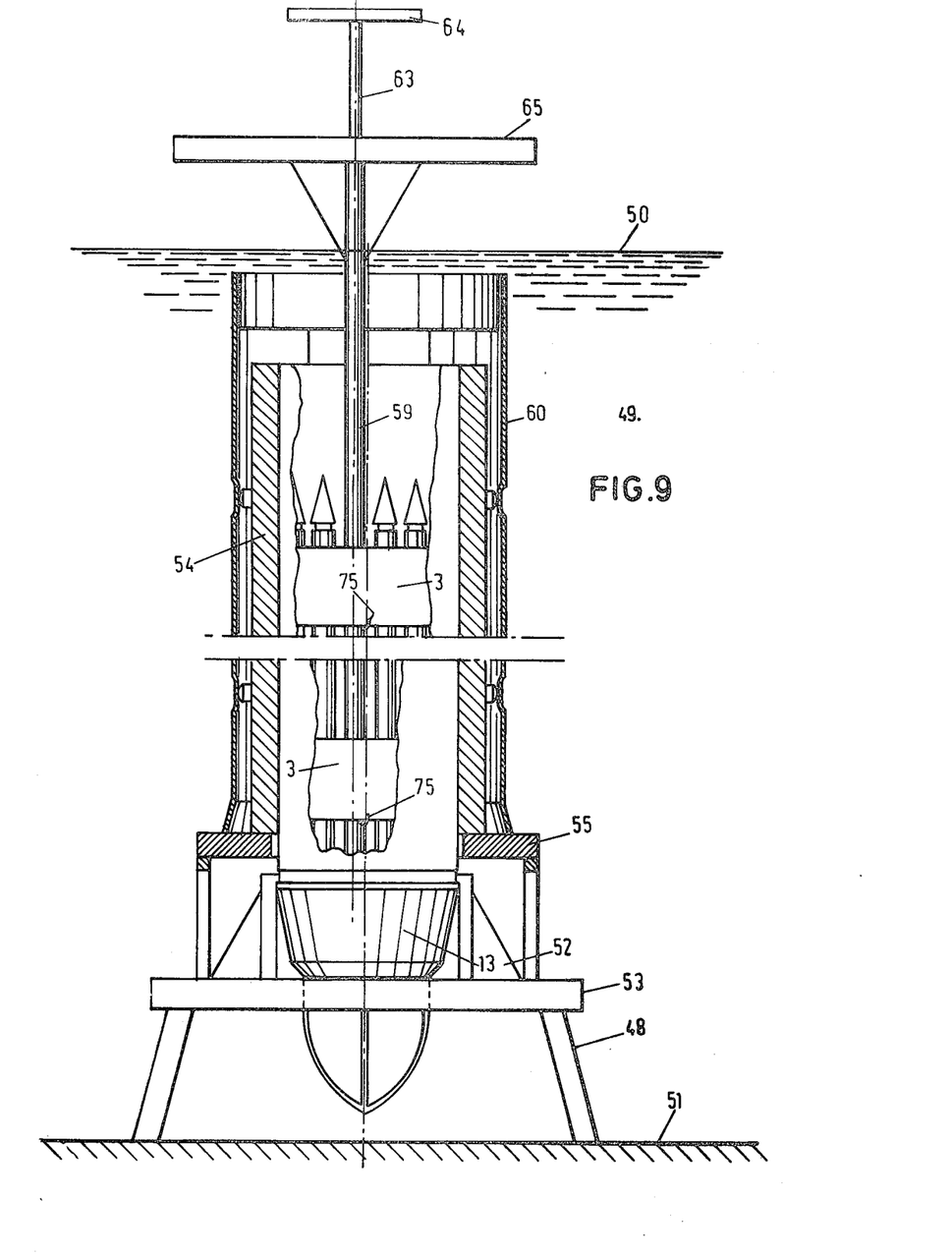
FIG. 9: a vertical cross-section of the device that is used for charging a fissile element.
Figures 10, 11:
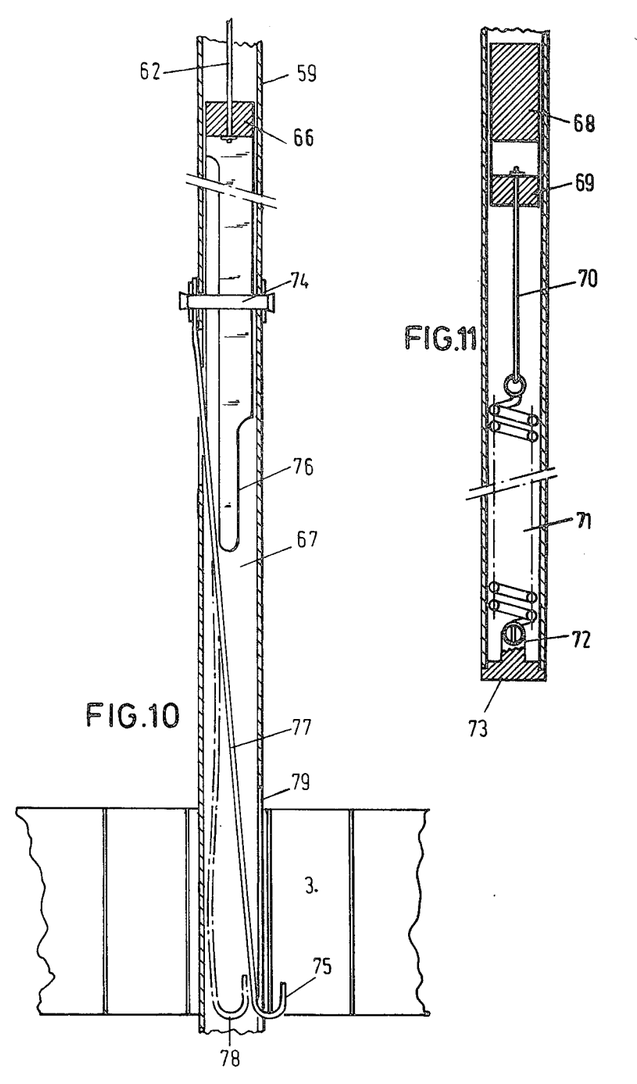
FIG. 10: detail A of the device illustrated in FIG. 9.
FIG. 11: the lower end of the detail depicted in FIG. 10.
Figures 12, 13B:
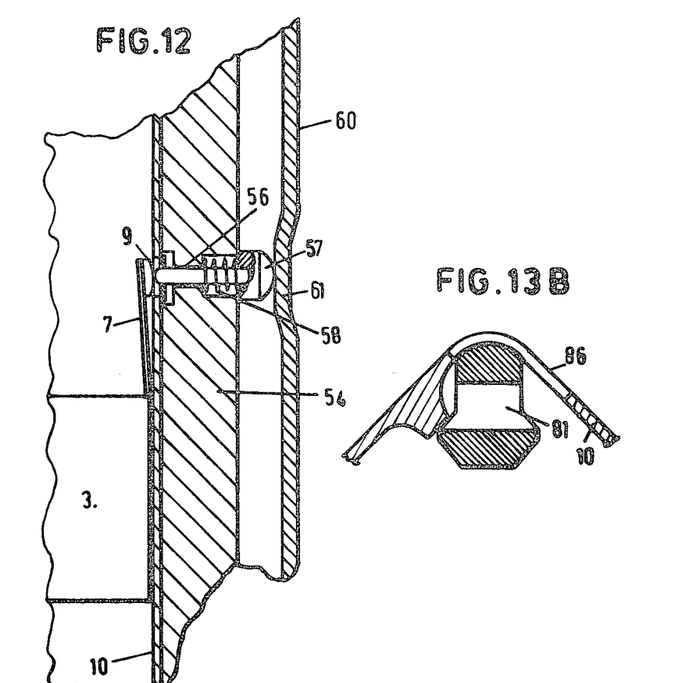
FIG. 12: a vertical cross-section of detail B in FIG. 9.
FIG. 13b: a bottom view on bolt head 81, in unscrewed position.

FIG. 9 depicts the device that is used for removing the entire bunch of rods from the fissile element, e.g. after the rods have been burntup. The fissile element 4 is for this purpose mounted in basin 49, in such a manner that base 13 is pressed by clamp 52 on to table 53 of foundation 48. This foundation is placed in the bottom 51 of the basin. After this the tilting bolts are undone in the manner already described and the head of the fissile element removed. Next, a cylinder 54 is mounted on a base 55. Detail B, depicted in FIG. 12, shows that in the interior of cylinder 54, pins 56 are provided which have an operating peg 57. On the underside of this operating peg there is a small spring 58. After the implement 59 which serves to give support to the intermediate lattices 3 has been applied, a sleeve 60 is placed around cylinder 54. This sleeve 60 is indented at several places, as a result of which the wall is bulged inwards at 61. These inward bulges have been made in such a way that they are positioned precisely opposite the pegs 57. These pegs therefore push pin 56 inwards, thereby unlocking the plate spring 7 with peg 9. In this way the intermediate lattices 3 are uncoupled from the prismatic sleeve and can be moved in an upward direction by means of implement 59. The said implement is depicted in FIGS. 10 and 11, of which FIG. 11 must be considered to be at the underside of FIG. 10. Item 59 in FIG. 10 is in this case connected with the handle 65 shown in FIG. 9.

Similarly, the connecting element 62 is connected with 63 and thereby with handle 64 (see FIG. 9). The connecting element 62 is, as can be seen in FIG. 10, connected with component 66, which itself is connected via 67 with 68 and 69 (see FIG. 11). A tensile force is permanently exerted upon 69 by means of cable 70 and extension spring 71. Spring 71 is in fact rigidly attached, at position 72 on its inner side, to the bottom 73 of sleeve 59. Passing at various distances right across the latter, a pin 74 is provided which has a hook 75 fixed to it. In this set-up the connecting part 77 between pin 74 and hook 75 is sprung in such a way that, when untensioned, hook 75 projects outwards through slot 79. As soon as component 76 is moved downwards by means of handle 64 and connecting member 62, spring 77 is deflected in such a way that hook 75 comes into position 78.

With this positioning, implement 59 is moved downwards until hooks 75 come under the intermediate lattices. Then, by means of handle 64, the hooks are caused to move outwards into position 75, after which the intermediate lattice can be removed in an upward direction from the fissile element.

For the provision of a fresh supply of fissile material the fissile rods together with the lattices are assembled in the inverted position and frozen into a block of demineralized water as described in the foregoing. This block is then slid into the prismatic sleeve which has still remained standing in the service basin. After being pressed down so that the cylindrical pins of the fissile elements snap into position behind groove 44 of the cylindrical sleeves 41, the head of the fissile element is mounted, after which the tilting bolts are placed in position and tightened. The fissile element is now ready for use. Lastly, it is to be noted that wherever the word "fissile" is used in the present patent application it relates to breeding material.

Figure 13:
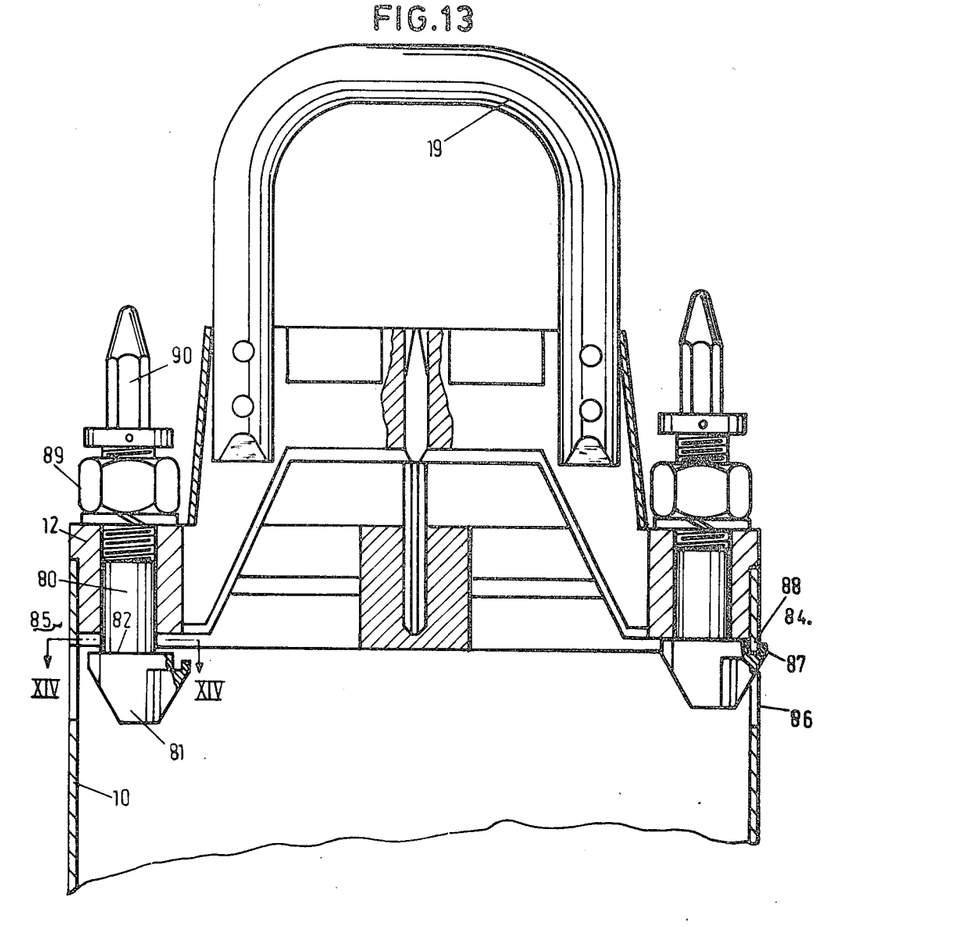
FIG. 13: a vertical cross-section of a variant of FIG. 4, equipped with pivot bolts.
Figure 13A:
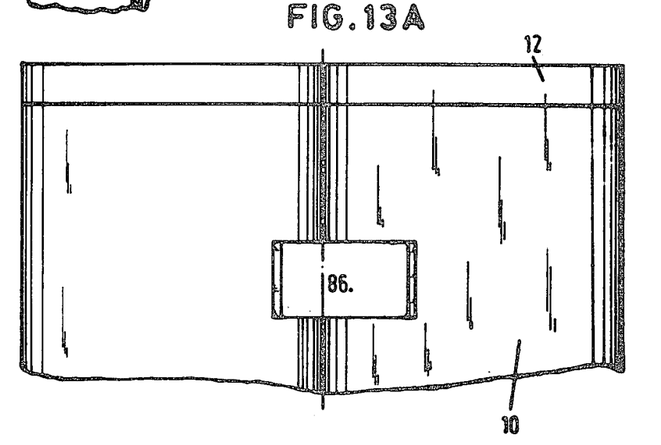
FIG. 13a: a side view on sleeve 10.
Figure 14:
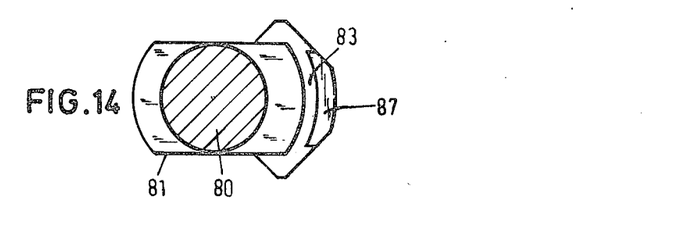
FIG. 14: a detail of FIG. 13.

In FIG. 13 a variant of FIG. 4 is illustrated in which pivot bolts 80 are used for rigidly fixing head 12 to sleeve 10. The bolts have a bolt-head 81 (see detail of FIG. 14, which gives a view towards the press-down face of a bolt-head and at the same time shows a cross-section of the shaft of the bolt). Each bolt-head has a securing slot 83 which secures the head against turning and at the same time clamps head 12 against sleeve 10, as illustrated by position 84. With this position peg 87 of the bolt-head engages through aperture 86 such a way that edge 88 fits into slot 83.

The pivot bolt can be brought into position 85 by unscrewing nut 89 over a certain length, so that bolt-head 81 can be moved downwards until peg 87 is released from edge 88. Bolt-head 81 can now be turned 180° by means of the hexagonal head 90 at the top end of bolt 80. After this has been done with all four pivot bolts, head 12 can be loosened from sleeve 10.

We claim:
1. A fuel assembly for a nuclear reactor comprising an open-ended elongated approximately prismatic sleeve with solid side walls, a plurality of spaced fuel elements vertically disposed in said sleeve and supported therein by a bottom plate and a plurality of intermediate lattices for lateral support, said bottom plate being anchored to said sleeve, said sleeve containing near the upper end a plurality of open recesses in the walls thereof, a removable head fitted to the top of said sleeve and connected to the sleeve in an easily detachable manner by means of a plurality of bolts passing through passages in said head, said bolts having boltheads at one end thereof, said boltheads each having a portion projecting into and engaging one of said open recesses and said passages being contoured to allow said bolts to tilt to facilitate movement of said boltheads into and out of said recesses.

2. A fuel assembly as claimed in claim 1 wherein the bolthead portions are claw shaped to facilitate engagement with said recesses.

3. A fuel assembly as claimed in claim 1 wherein each of said bolthead portions has a surface facing said head, said surface having a slot in which the wall of said sleeve engages when the respective bolthead portion projects into the respective recess, said bolts being rotatable in said passages in order to insert and withdraw said bolthead portions into and from said recesses.

4. A fuel assembly for a nuclear reactor comprising an open-ended elongated approximately prismatic sleeve with solid side walls, a plurality of spaced fuel elements vertically disposed in said sleeve and supported therein by a bottom plate and a plurality of intermediate lattices for lateral support, said bottom plate being anchored to said sleeve, said intermediate lattices having outer jackets and being fixed to the sleeve by means of resilient retainers that are constructed as a sideway extension of the outer jackets in the form of plate springs, each plate spring having at its free end a peg which locks into an aperture of the sleeve wall, said plate spring being provided on its inner wall with a dowel-like anchoring pin directed toward the inside of the sleeve.

* * * * *